F. G. CLARKE.
CLOTHES-POUNDER.

No. 176,928.

Patented May 2, 1876.

Witnesses—
David G. Weems.
R. K. Evans

Inventor—
Francis G. Clarke
by his attys.
A. H. Evans & Co
Washington D.C.

UNITED STATES PATENT OFFICE.

FRANCIS G. CLARKE, OF MOUNT VERNON, OHIO, ASSIGNOR TO HIMSELF AND BENJAMIN A. F. GREER, OF SAME PLACE.

IMPROVEMENT IN CLOTHES-POUNDERS.

Specification forming part of Letters Patent No. 176,928, dated May 2, 1876; application filed April 18, 1876.

*To all whom it may concern:*

Be it known that I, FRANCIS G. CLARKE, of Mount Vernon, in the State of Ohio, have invented a new and Improved Clothes-Pounder; and I hereby declare the following to be a full, clear, and exact description thereof, reference being had to the accompanying drawing, making a part of this specification, in which—

Figure 2:
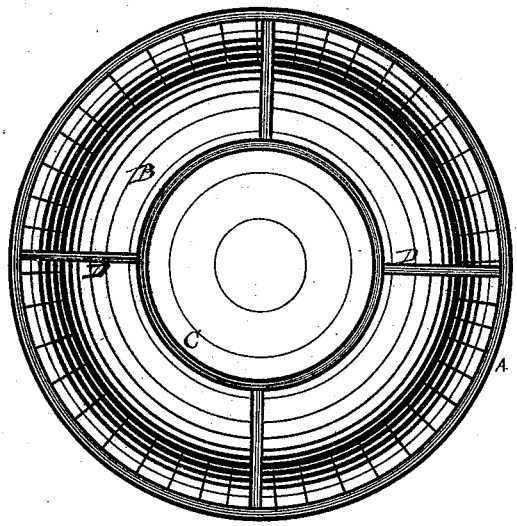
Figure 1:
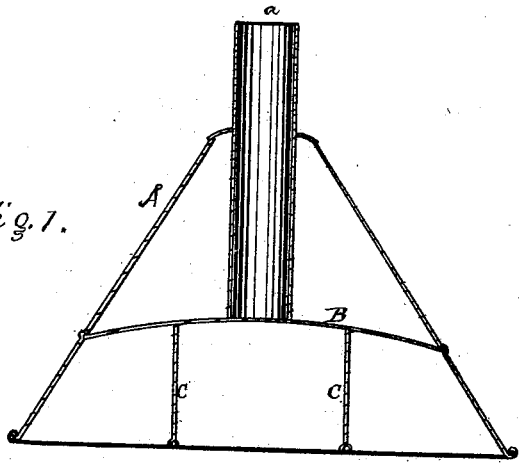

Figure 1 is a vertical cross-section; Fig. 2, a bottom view.

My invention relates to clothes-pounders, and is an improvement on Letters Patent granted to me on March 28, 1876, and No. 175,240; and it consists in certain details of construction, hereinafter more specifically described and claimed.

In order that those skilled in the art may make and use my invention, I will proceed to describe the manner in which I have carried it out.

In the said drawings, A is a sheet-metal hollow truncated cone, having at its apex a socket-tube, a, which extends down into it until it rests upon and braces a diaphragm, B, which crosses the cone. From the lower edge of the cone to the diaphragm B is a circular partition, C, smaller than the lower edge or largest circumference of the cone A, and concentric therewith. Extending from the central cylindrical partition C are four wings or partitions, D D, having their edges securely soldered to the sides of the cone A, central cylinder C, and diaphragm B. These parts all serve to form the divisions necessary in a clothes-pounder, and each one braces the others so as to securely strengthen all.

It is evident that the internal partition C may be made to conform in outline to that of the cone A without departing from the spirit of my invention.

I am aware that heretofore in clothes-pounders radial partitions have been combined with and located in an outer sheet-metal casing, and I therefore do not claim this broadly; but

Having thus described my invention, what I claim as new, and desire to secure by Letters Patent, is—

As an improved article of manufacture, a clothes-pounder consisting of the cone A, provided with the internal cylindrical partition C, straight partitions D D, and diaphragm B, braced by the socket-tube a, substantially as set forth.

FRANCIS G. CLARKE.

Witnesses:
ROBERT CLARKE,
DAVID G. WEEMS.